Jan. 12, 1943.  J. C. ENGLISH  2,308,272
THERMOSTATIC CONTROL MEANS
Original Filed Aug. 30, 1939
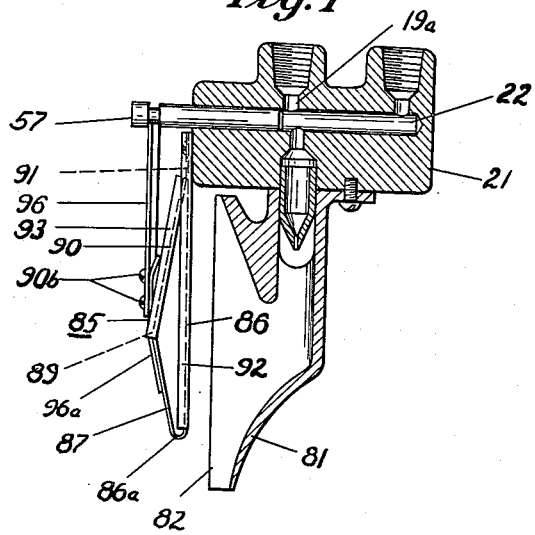
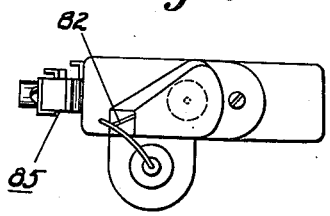
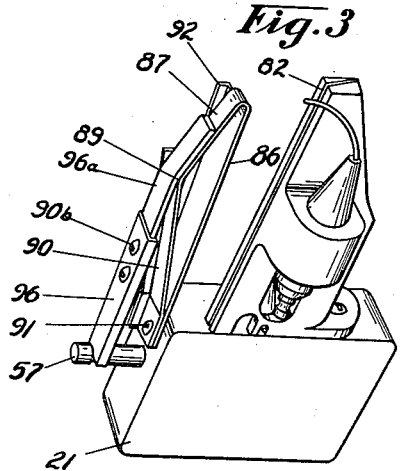
INVENTOR.
JOHN C. ENGLISH
BY
*Flournoy Corey*
ATTORNEY.

Patented Jan. 12, 1943

2,308,272

UNITED STATES PATENT OFFICE 2,308,272

THERMOSTATIC CONTROL MEANS

John C. English, Cedar Rapids, Iowa, assignor to Johnson Gas Appliance Company, Cedar Rapids, Iowa, a corporation of Delaware Original application August 30, 1939, Serial No. 292,693. Divided and this application February 17, 1940, Serial No. 319,502

6 Claims. (Cl. 297—11)

This invention relates to a thermostatic control means and has particular relation to a new and improved thermostatic element and a fluid flow control means associated with and actuated by said element. The present application is a division of my application Serial Number 292,693 on "Ignition and control means for fuel burners," filed August 30, 1939, which said parent application is a continuation in part of my copending application Serial Number 281,549.

The thermostatic control, which is the subject matter of this application, has been found particularly suitable in connection with control systems for gas burners and the like, but of course may be used in other systems and for other purposes.

A main object of my invention is to provide a thermostatic element whose operation is the same no matter what the surrounding temperature, the movement being obtained by a differential in heat applied to the element—that is, by applying more heat on one side than on the other.

Another object of my invention is to provide a thermostatic element in which the necessity for a bi-metal or combination of metals is eliminated.

Another object of my invention is to provide a thermostatic element which is extremely sensitive but rugged and powerful.

Other objects of my invention are to provide a relatively simple and inexpensive thermostat element which is extremely sensitive and which is particularly desirable in connection with a heating system such as the pilot burner of a fluid fuel burner.

Another object of my invention is to provide a combined thermostat and control means in which friction of the parts thereof is at a minimum, so that deformation of the parts is avoided and an adjustment of the control means, once secured, may be indefinitely maintained.

A further object of my invention is the provision of a heat sensitive or heat actuated device in which the necessity for a bi-metal element is eliminated.

Another object of my invention is to provide a control means which is extremely rapid in action so that recycling of the control means is practically instantaneously accomplished.

Still another object of my invention is to provide, in connection with a pilot burner, control means for controlling the flow of fuel to the pilot burner which may be maintained at a minimum so that the pilot burner will not supply so much heat to the oven or other heated space that an oven regulator or the like is inoperative or incapable of properly controlling the heat supply.

Still another object of my invention is to provide a thermostat control which has a large amplitude of movement in response to small changes in temperature.

Other and further features and objects of the invention will be more apparent to those skilled in the art upon a consideration of the accompanying drawing and following specifications, wherein is disclosed an exemplary embodiment of the invention with the understanding, however, that such changes may be made therein as fall within the scope of the appended claims, without departing from the spirit of the invention.

In said drawing:

Figure 1 is a plan view, partly in section, of a throttling device and thermal element constructed in accordance with one embodiment of my invention.

Figure 2 is an end view in elevation of the device shown in Figure 1, and

Figure 3 illustrates the appearance of the device as shown in Figures 1 and 2 as viewed from below.

Referring now to the drawing:

A device constructed according to a preferred embodiment of my invention includes a pilot burner 82, a plunger valve 57, and a thermal element 85.

The unit is preferably adapted to be used in a horizontal plane, as shown in Figure 2, and in conjunction with a gas burner or the like. The pilot burner housing 81 is provided with a slot 82 which serves to direct the pilot flame horizontally so as to cause the flame to "wipe" upwardly against the inner side of the thermal element 85. Fuel is introduced into the pilot burner through port 19a.

The thermal element 85 is, in a preferred form, comprised of a metal strip so formed, arranged, and positioned with respect to the pilot flame, as to be heated unevenly by the flame. The thermal element may be comprised of a "rigid" leg, such as the leg 86, and a movable or moving leg 87—90. In the preferred structure here shown, a single strip of metal, such as stainless steel or the like, is employed, and this strip is bent back upon itself to form an acute angle with itself as at 86a. The leg 86 is preferably stiffened by means of a flange 92.

The flexible portion of the element is comprised of the short leg 87 and the long leg 90. The junction of the short and long legs form a bend as at 89. The extreme ends of the metal strip are riveted or otherwise fastened together at 91 at which point the thermal element is fastened to the housing 21 of the throttle valve.

The plunger 57 is actuated by means of a lever 96 attached to the portion of the thermal element which is subjected to the greatest bending. In this instance, the lever is fastened to the short leg 87. The long leg 90 is preferably reinforced or stiffened as by means of a flange 93.

The lever 96 includes a short curved member 96a to which the lever proper is secured as by screws 90b. Adjustment of the position of the plunger 57 with respect to the port 19a is secured by adjusting the screws 90b to rock the lever arm 96 on the short curved portion 96a.

The operation of this thermal element is as follows: When the pilot flame is ignited, the flame wipes upwardly over the portion or leg 86, thus heating and lengthening it. The portions 87 and 90 do not receive a proportionate amount of heat and therefore do not expand or lengthen to the same extent. The lengthening of the leg 86 tends to flatten out the bend 89 and thus move the outer end of the arm 96 toward the housing to partially close the port 19a by movement of the plunger 57.

It is obvious that a small quantity of gas should be permitted to pass through the port 19a at all times so as to maintain at least a small pilot flame whenever the main burner is in operation.

The described thermal element is very sensitive and rapid in action at any oven temperature. When the pilot burner is lighted or extinguished, only on the order of five seconds is required to provide sufficient movement of the thermal element to effect complete throttling operation.

It is obvious that, although the thermostat may be located within an oven, there will be no unequal stresses set up in the thermal element by the oven heat, and therefore no movement of the element. A slight amount of heat, however, properly applied so as to heat the element unevenly, will serve to energize the element and cause a distortion or movement thereof.

A thermal element, constructed in accordance with my invention, is very sensitive and a control means operated thereby is practically instantaneously operative and will immediately recycle, in conjunction with suitable ignition means, as soon as gas is supplied to the pilot burner. Explosions are thus impossible. The throttling valve or plunger 57 will control the flow of gas to the pilot burner and maintain it at a minimum because if the thermostatic element becomes too hot the plunger is driven further into the channel or cylinder 22 to reduce the flow of gas to the pilot burner. If the thermostatic strip cools, the plunger uncovers some of the port 19a and the flow of gas to the pilot burner is increased. There is no stress on the element at any time which would cause it to fatigue or change its setting.

Although I have described a specific embodiment of my invention, it is apparent that modifications thereof may be made by those skilled in the art. Such modifications may be made without departing from the spirit and scope of my invention as set forth in the appended claims.

I claim as my invention:

1. A thermostatic control means including a mounting base and a thermostatic element, said element comprising a single relatively thin and narrow strip of metal having a relatively long straight portion fastened at one end to the base and bent at the opposite end of the straight portion to loop the strip of metal back on itself, the loose end thereof also being fastened to the base, and the looped portion of the strip being arched to provide a triangular shaped element, with one leg of the looped portion substantially shorter than the other leg, and a lever control arm affixed at one end to the short leg, the first mentioned long straight portion of the element being flanged to afford stiffness to permit the application of heat without buckling.

2. In a thermostatic element, a relatively thin narrow strip of metal fastened together at the extreme ends and bent to form a roughly triangular shaped element having three sides of unequal length, the longest being flanged to afford rigidity against buckling due to heat, and a control arm affixed at one end thereof to the shortest arm to thereby afford the maximum movement of the free end of the control arm when heat is applied to the longest side of the element.

3. In a thermostatic element, a relatively thin narrow strip of metal fastened together at the extreme ends and bent to form a roughly triangular shaped element having three sides of unequal length, the longest being flanged to afford rigidity against buckling due to heat, a control arm affixed to the shortest arm, and means for adjusting the normal position of the free end of the control arm.

4. In a thermostatic element, a relatively thin narrow strip of metal fastened together at the extreme ends and bent to form a roughly triangular shaped element having three arms, one of which is longer than the other two, means to afford rigidity for the longest arm and one of the other arms against buckling due to heat, and a control arm affixed at one end thereof to one of said other arms and extending beyond the apex of said other arms to afford movement of the free end of the control arm when heat is applied to the longest arm of the thermostatic element.

5. A thermal element for use in conjunction with the flame from a heater, said thermal element comprising a triangular loop of metal having one leg thereof substantially straight, the other two legs forming an obtuse angle with each other, and a lever arm having one end attached to one of said other two legs and extending beyond the apex of said other two legs whereby the greater portion of heat from a heater directed against said one leg of the loop causes uneven heating of the loop and bending of said other two legs at said obtuse angle, thereby swinging the lever arm to move its outer end.

6. A thermostatic control means including a base, a thermostatic element including a strip of metal having one portion thereof secured to the base at one end of the strip and a second portion looped back on said first portion, said second portion being arched and the end of said second portion being also secured to said base whereby heat directed against only said first portion of said strip takes advantage of the difference of expansion between said first and second portions, and lever means attached to said second portions and extending beyond the zenith of the arch and beyond the secured end of said second portion, said loop in responding to such difference of expansion between said first and second portions effecting movement of said lever means and thereby of apparatus desired to be controlled.

JOHN C. ENGLISH.